United States Patent [19]
Freedman

[11] Patent Number: 5,372,669
[45] Date of Patent: * Dec. 13, 1994

[54] COMPOSITE FACESTOCKS AND LINERS

[75] Inventor: Melvin S. Freedman, Beachwood, Ohio

[73] Assignee: Avery Dennison Corporation, Pasadena, Calif.

[*] Notice: The portion of the term of this patent subsequent to Aug. 7, 2007 has been disclaimed.

[21] Appl. No.: 47,865

[22] Filed: Apr. 15, 1993

Related U.S. Application Data

[60] Continuation of Ser. No. 937,066, Aug. 26, 1992, which is a continuation of Ser. No. 758,385, Sep. 3, 1991, Pat. No. 5,143,570, which is a continuation of Ser. No. 322,720, Mar. 13, 1989, abandoned, which is a division of Ser. No. 88,402, Aug. 24, 1987, Pat. No. 4,888,075, which is a division of Ser. No. 853,772, Apr. 18, 1986, Pat. No. 4,713,273, which is a continuation-in-part of Ser. No. 699,204, Feb. 5, 1985, abandoned.

[51] Int. Cl.$^5$ .............................................. B32B 31/18
[52] U.S. Cl. .................. 156/243; 156/244.11; 156/244.18; 156/244.19; 156/244.24; 156/267; 428/40; 428/202
[58] Field of Search ............... 156/243, 244.11, 244.18, 156/244.19, 244.24, 267; 428/40, 202

[56] References Cited

U.S. PATENT DOCUMENTS

| | | |
|---|---|---|
| 2,718,666 | 9/1951 | Knox . |
| 2,920,352 | 5/1954 | Miller . |
| 3,011,358 | 7/1954 | Roelofs . |
| 3,036,945 | 10/1958 | Souza . |
| 3,100,722 | 3/1960 | Herrmann . |
| 3,154,461 | 3/1960 | Johnson . |
| 3,187,982 | 7/1960 | Underwood . |
| 3,354,506 | 4/1962 | Raley . |
| 3,370,951 | 11/1966 | Hausenauer . |
| 3,382,206 | 12/1966 | Karickhoff . |
| 3,468,744 | 2/1966 | Reinhart . |
| 3,515,626 | 2/1966 | Duffield . |
| 3,690,909 | 2/1970 | Finley . |
| 3,841,943 | 11/1971 | Takashi . |
| 3,871,947 | 1/1973 | Brekken . |
| 3,894,904 | 6/1973 | Cook . |
| 3,908,065 | 4/1974 | Stigen . |
| 3,924,051 | 4/1974 | Wiggins . |
| 3,936,567 | 3/1974 | Vesely . |
| 3,963,851 | 7/1974 | Toyoda . |
| 3,968,196 | 3/1976 | Wiley . |
| 3,979,000 | 7/1976 | Karabedian . |
| 4,008,115 | 2/1976 | Fairbanks . |
| 4,020,215 | 4/1976 | Michaylov . |
| 4,051,293 | 4/1976 | Wiley . |
| 4,057,667 | 4/1976 | Wiggens . |
| 4,069,934 | 1/1978 | Karabedian . |
| 4,082,880 | 4/1976 | Zboril . |
| 4,091,150 | 5/1976 | Roelofs . |
| 4,100,237 | 6/1976 | Wiley . |
| 4,118,438 | 11/1976 | Matsui . |
| 4,172,163 | 6/1978 | Magnotta . |
| 4,188,443 | 8/1978 | Mueller . |
| 4,233,367 | 8/1978 | Ticknor . |
| 4,235,341 | 3/1978 | Martin . |
| 4,242,402 | 4/1978 | Korpman . |
| 4,246,058 | 11/1978 | Reed . |

(List continued on next page.)

FOREIGN PATENT DOCUMENTS 888148 12/1971 Canada .

(List continued on next page.)

OTHER PUBLICATIONS

OPTICITE Label Films—Printing, brochure—Dow Chemical U.S.A., Films Group, Form No. 500-10-87-1085.

(List continued on next page.)

Primary Examiner—Caleb Weston
Attorney, Agent, or Firm—Pearne, Gordon, McCoy & Granger

[57] ABSTRACT

Film-forming means are coextruded to form all plastic multilayer liners and facestocks for pressure-sensitive labels, tapes, decals, signs, bumper stickers, and other products formed from sheet and roll stock. Fill means in a charge for the liner coextrusion affects stiffness and dimensional stability of the liner and/or affects the roughness of a liner face or faces. The film materials of the layers of the constructions are selected according to the cost/benefit characteristics of candidate materials considering the functional or operational requirements of the layer in question.

11 Claims, 1 Drawing Sheet

U.S. PATENT DOCUMENTS

| | | |
|---|---|---|
| 4,254,169 | 12/1978 | Schroeder . |
| 4,331,727 | 5/1982 | Maas . |
| 4,343,851 | 8/1982 | Sheptak . |
| 4,346,855 | 8/1982 | Biggar . |
| 4,361,628 | 11/1982 | Krueger . |
| 4,377,050 | 3/1983 | Renholts . |
| 4,377,616 | 3/1983 | Ashcraft . |
| 4,379,806 | 4/1983 | Korpman . |
| 4,380,567 | 4/1983 | Shigemoto . |
| 4,386,135 | 5/1983 | Campbell . |
| 4,389,450 | 6/1983 | Schaefer . |
| 4,393,115 | 7/1983 | Yochii . |
| 4,398,985 | 8/1983 | Eagon . |
| 4,402,172 | 9/1983 | Krueger . |
| 4,405,401 | 9/1983 | Stahl . |
| 4,407,897 | 10/1983 | Farrell . |
| 4,410,582 | 10/1983 | Tsunashima . |
| 4,424,256 | 1/1984 | Christensen . |
| 4,425,410 | 1/1984 | Farrell . |
| 4,429,015 | 1/1984 | Sheptak . |
| 4,438,175 | 3/1984 | Ashcraft . |
| 4,463,861 | 8/1984 | Tsubone . |
| 4,464,443 | 8/1984 | Farrell . |
| 4,472,227 | 9/1984 | Toyoda . |
| 4,513,050 | 4/1985 | Akao . |
| 4,517,044 | 5/1985 | Arnold . |
| 4,522,887 | 6/1985 | Koebisu . |
| 4,525,416 | 6/1985 | Hammerschmi . |
| 4,528,055 | 7/1985 | Hattemer . |
| 4,529,654 | 7/1988 | Drum . |
| 4,544,590 | 10/1985 | Egan . |
| 4,551,380 | 11/1985 | Schoenberg . |
| 4,568,403 | 3/1986 | Egan . |
| 4,581,262 | 4/1986 | Karabedian . |
| 4,582,736 | 4/1986 | Duncan . |
| 4,582,752 | 4/1986 | Duncan . |
| 4,582,753 | 4/1986 | Duncan . |
| 4,585,679 | 4/1986 | Karabedian . |
| 4,617,241 | 10/1986 | Mueller . |
| 4,626,455 | 12/1986 | Karabedian . |
| 4,626,460 | 12/1986 | Duncan . |
| 4,650,721 | 3/1987 | Ashcraft . |
| 4,673,611 | 6/1987 | Crass . |
| 4,680,234 | 7/1987 | Kelch . |
| 4,702,924 | 10/1987 | Duncan . |
| 4,716,068 | 12/1987 | Siefried . |
| 4,724,186 | 2/1988 | Kelch . |
| 4,780,364 | 10/1988 | Wade . |

| | | | |
|---|---|---|---|
| 5,151,309 | 9/1992 | Dollinger | 428/40 |

FOREIGN PATENT DOCUMENTS

| | | |
|---|---|---|
| 1138817 | 1/1983 | Canada . |
| 060421 | 9/1982 | European Pat. Off. . |
| 3422302 | 12/1985 | Germany . |
| 3501726 | 7/1986 | Germany . |
| 58-113283 | 9/1982 | Japan . |
| 59-122570 | 9/1982 | Japan . |
| 633481 | 12/1982 | Switzerland . |
| 1384556 | 2/1975 | United Kingdom . |
| 1404018 | 8/1975 | United Kingdom . |
| 1578517 | 11/1980 | United Kingdom . |

OTHER PUBLICATIONS

Soda Packaging Looks Super when Printed, information sheet, Copyright 1984, The Dow Chemical Company.

OPTICITE Label Film 320—information specification sheet, Copyright 1985, The Dow Chemical Company, Form No. 500-1058-85.

OPTICITE Label Film 330—information specification sheet, Copyright 1985, The Dow Chemical Company, Form No. 500-1059-85.

OPTICITE Label Film 420—information specification sheet, Copyright 1985, The Dow Chemical Company, Form No. 500-1060-85.

OPTICITE Label Film 410—information specification sheet, Copyright 1985, The Dow Chemical Company, Form No. 500-1061-85.

OPTICITE Label Film Supplier Information, information sheet, Copyright 1985, The Dow Chemical Company, Form No. 500-1062-85.

OPTICITE Label Film Technical Information for Printing, information sheet, Copyright 1985, The Dow Chemical Company, Form No. 500-1063-85.

New OPTICITE Polystyrene Label Films, brochure, The Dow Chemical Company, Form No. 500-1053-84.

OPTICITE Soft Drink Label Film 320, information sheet, The Dow Chemical Company, Form No. 500-1046-84.

Label Film Offers Design Options, reprint from Paper, Film & Foil Converter, Apr., 1985, The Dow Chemical Company, Form No. 500-1084-85.

(List continued on next page.)

OTHER PUBLICATIONS

Plastic Film Labels Have Vivid Graphics, High-Gloss, and Moisture Resistance, reprint from Prepared Foods, Sep., 1984, The Dow Chemical Company, Form No. 500-1084-84.

OPTICITE Soft Drink Label Films, brochure, Copyright 1985, The Dow Chemical Company.

OPTICITE Label Film 320, information sheet, Copyright 1985, The Dow Chemical Company, Form No. 500-1046-85.

OPTICITE Label Film 330, information sheet, Copyright 1985, The Dow Chemical Company, Form No. 500-1047-85.

OPTICITE Label Film 410, information sheet, Copyright 1985, The Dow Chemical Company, Form No. 500-1049-85.

OPTICITE Label Film XU 65006.06, information sheet, Copyright 1985, The Dow Chemical Company, Form No. 500-1048-85.

OPTICITE Soft Drink Label Film, information sheet, Copyright 1985, The Dow Chemical Company, Form No. 500-1050-85.

OPTICITE Soft Drink Label Film, information sheet, Copyright 1984, The Dow Chemical Company, Form No. 500-1054-84.

Printing on OPTICITE Polystyrene Films, brochure, The Dow Chemical Company, Form No. 500-1076-85.

Supplier Information for Users of OPTICITE Films, information sheet, The Dow Chemical Company, Form No. 500-1081-85.

Commercial Dialogue, Apr. 30, 1984, "Coca-Cola and Pepsi Test Dow's Label Film".

Printing TRYCITE Plastic Films, brochure, Copyright 1982, The Dow Chemical Company.

Bicor Communication, OPPALYTE Observations, brochure, Jul. 1, 1983, Mobil Chemical Films Division.

Hercules WT503, WT502/1S and WT502/2S, product bulletin, Hercules Incorporated, FC-17G.

MICAFIL 40, information sheet, DuPont Canada, Inc.

Opportunities and Requirements for Coextruded Beverage Bottle Labels, Paper by Michael C. Paddock at 1985 Coextrusion Conference, pp. 85-98.

Proprietary Information Disclosure Agreement between Avery International Corporation and Package Products Co., dated Feb. 14, 1984.

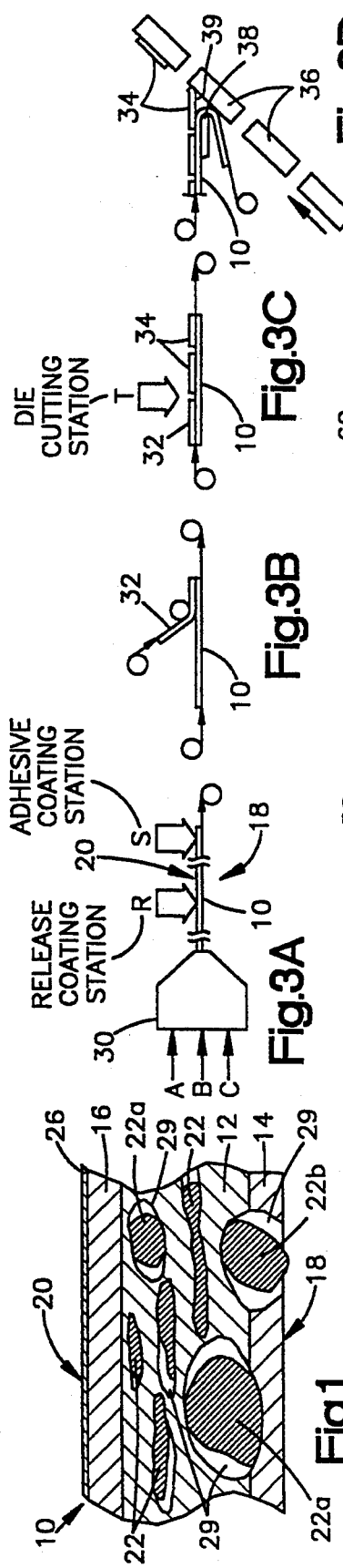
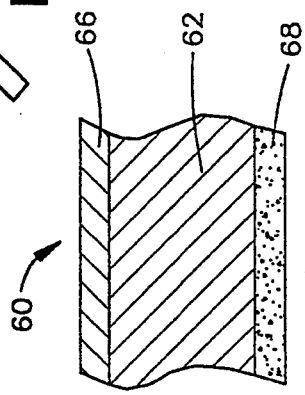
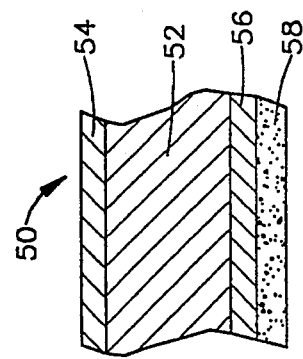
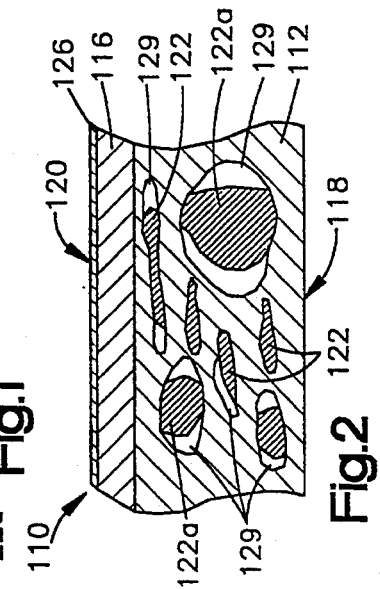
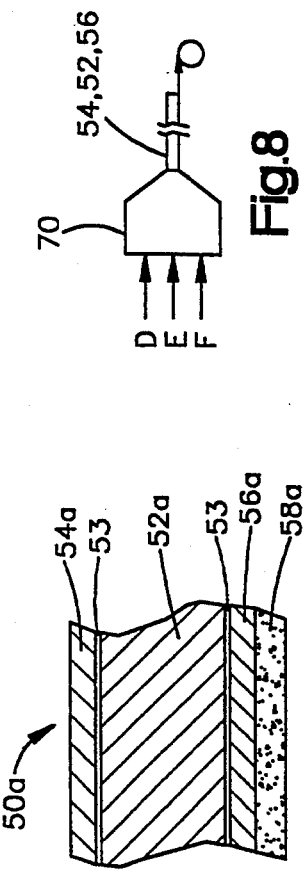
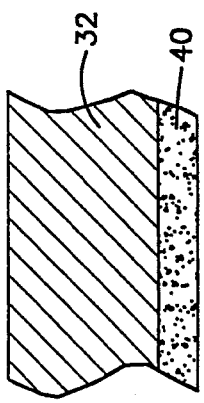

COMPOSITE FACESTOCKS AND LINERS

This is a continuation of application Ser. No. 07/937,066, filed Aug. 26, 1992, which is a continuation of Ser. No. 07/758,385, filed Sep. 3, 1991, now U.S. Pat. No. 5,143,570, which is a continuation of Ser. No. 07/322,720, filed Mar. 13, 1989, abandoned, which is a division of Ser. No. 07/088,402, filed Aug. 24, 1987, now U.S. Pat. No. 4,888,075, which is a division of Ser. No. 06/853,772, filed Apr. 18, 1986, now U.S. Pat. No. 4,713,273, which is a continuation-in-part of Ser. No. 06/699,204, filed Feb. 5, 1985, now abandoned.

The present invention relates to web stock for display produces such as labels, signs and the like, and more particularly to constructions and methods of making film facestocks for such display products, liners for such facestocks, and to the combined constructions including the facestocks and liners.

BACKGROUND OF THE INVENTION

It has long been known to manufacture and distribute pressure-sensitive adhesive stock for display products such as labels and signs by providing a layer of face material for the label or sign backed by a layer of pressure-sensitive adhesive which in turn is covered by a release liner. The liner protects the adhesive during shipment and storage. With specific reference to labels, the liner also allows for efficient handling and dispensing of individual labels which have been die-cut from the layer of face material while leaving the liner uncut.

Many label and sign applications require that the face material be a polymeric film material which can provide properties lacking in paper, such as weatherability (for outdoor signs), strength, water resistance, abrasion resistance, gloss and other properties. Because material costs in the manufacture of such film facestocks are relatively high, the desirability of reducing material costs without sacrifice of quality has long been apparent, but little or nothing has been accomplished toward this end.

Because the cost of paper generally compares favorably with the cost of film materials, and because paper liners also have other highly desirable characteristics, the liners used with film facestocks have generally comprised paper web stock coated with a very thin layer of silicone-based release agent. The paper web's outer or "back" face has the roughness required to track well on the smooth steel rolls used in high speed manufacturing. The inner release-coated face of the paper web is uneven enough to slightly roughen the surface of the adhesive protected by the liner, thus preventing subsequent air entrapment and bubble formation between label and container in labeling applications.

However, paper readily absorbs and desorbs moisture, leading to curling and distortion of film facestock with which a paper liner is used. This is particularly a problem with sheet facestock used, say, for signs and decals. Moisture absorption and curling have been reduced to a degree by coating the outside face of the paper liner with a thin moisture barrier layer of film material, but edge absorption or gradual moisture transmission through the moisture barrier itself have largely thwarted efforts to eliminate the problem of curling of the liner and consequent distortion of the film facestock.

Another disadvantage of paper is its relative mechanical weakness. This is particularly a drawback in high speed packaging of high volume consumer products where labeling machinery must dispense rolls of liner-carried labels at high speed. A break in the paper liner forces shutdown of the entire packaging line until the labeling operation is properly reset. As line speeds have continued to increase in recent years, the severity of this problem has led some mass packagers to specify that labels are to be carried on polyester film liner. The great strength of the polyester film eliminates the liner breakage problem, but at a price which reflects very much higher material costs than those associated with paper.

THE PRESENT INVENTION

The present invention opens the way to substantial cost savings in the manufacture of film facestocks while at the same time maintaining the desirable characteristics of the film facestocks which have been used prior to this invention. In a word, costs are greatly reduced at little or no sacrifice of quality, and even with a gain in quality in some instances.

In another aspect, the present invention replaces paper liner stock by liner stock of polymeric film material. This is done in such a way as to simulate those characteristics of paper that provide for good web tracking and adequate prevention of the problem of air entrapment and bubbling. At the same time, the problems of curling and paper breaking are eliminated because the film material used according to the invention is inherently moisture-insensitive and is much stronger than paper. All this is accomplished at little or no increase over the cost associated with paper liners. In a word, quality is greatly improved at little or no increase in costs, and even with a reduction in costs in some instances.

In the drawings, all of which are highly diagrammatic,

FIGS. 1 and 2 are fragmentary cross sections of two different liner constructions embodying the invention;

FIGS. 3A-3D illustrate certain steps in the manufacture and use of product embodying the invention;

FIG. 4 is a fragmentary cross section of a prior-art liner;

FIGS. 5-7 are fragmentary cross sections of three different facestock constructions embodying the inventions; and FIG. 8 illustrates a manufacturing step related to the facestock of the invention.

Liner stock constructions illustrating the invention will be described first. A prototypical example is illustrated in FIG. 1, which shows a multilayer web construction generally indicated by the reference numeral 10. The multilayer construction 10 includes a core or base layer 12, and skin layers 14 and 16. A first face, generally indicated by the reference numeral 18, is the outer or "back" face of the liner stock. This face is identified with the side of the web that will contact and be guided by the smooth steel rolls of the manufacturing line in which the liner stock is to be employed. A second face, generally indicated by the reference numeral 20, is the inner face of the liner. This face is identified with the side of the liner nearest the adhesive to be protected by the liner.

The layers 12, 14, and 16 comprise polymeric film materials and are formed by simultaneous extrusion from any suitable known type of coextrusion die such as, for example, a Cloeren "vane" die heretofore employed, for example, to fore multilayer films used in food packaging applications. The layers 12, 14, and 16 are firmly adhered to each other in a permanently combined state to provide a unitary coextrudate for all three layers, although any one or more polymers or copolymers which will form firmly adherent films when coextruded and which are otherwise suitable, particularly in respect of heat resistance and hardness, may be employed, such as polypropylene, acrylonitrile butadiene styrene, nylon, polystyrene, and other appropriate extrudable thermoplastics.

The core or base layer of the coextrudate is loaded with filler material to provide a continuous phase of the film-forming material itself and a discontinuous phase of the filler material. Thus, in the example of FIG. 1 the core or base layer 12 is loaded with mica filler 22 in naturally occurring platelet form. Mica is presently preferred as filler for its heat resistance and for its flatness which enhances its contribution to film stiffness, but other fillers having a high aspect ratio (ratio between greatest and least dimensions) may be used, such as wollastonite, glass fibers, talc, graphite platelets, graphite fibers, boron fibers, sapphire fibers, steel fibers, or polymeric or polyester fibers, e.g., DuPont's Kevlar. The filler comprises between about 5% and 40% by weight of the core layer and is mixed into the charge of film-forming resin which is fed to the extrusion orifice associated with formation of the core layer 12.

The naturally occurring platelet form of the mica 22 is seen edge-on in the diagrammatic illustration of FIG. 1, the individual platelets having significant width as well as length. These platelets orient themselves in the machine direction when passing through the extrusion die so as to be oriented lengthwise of the resulting extrudate as indicated in the drawing. These platelets contribute significantly to enhancing the heat resistance or dimensional stability and the stiffness of the extrudate film. The mica as used in commercial manufacture is a mined product containing "impurities" of inorganic ore particles such as quartz or feldspar which tend to be prune-shaped or lumpy rather than being acicular (non-rounded) or plate-like as is the mica. These lumpy particles 22a may include some particles whose bulk approaches or exceeds a majority of the thickness of the layer 12 in which they are contained. The particles 22a, and particularly the larger of such particles, act through the skin 16 to roughen or contribute to the roughness of the outer face thereof. They may also similarly contribute to the roughening of the outer face of the layer 14, i.e., the back face of the liner. Such filler is mixed into the charge of film-forming resin which is fed to the extrusion orifice associated with formation of the skin layer 14.

In most applications, the extrudate is hot-stretched, a stretch ratio of about 5:1 being employed, or a somewhat lower or higher ratio may be employed, say, from about 4:1 to about 9:1. Thus, using a 5:1 ratio, overall extrudate thickness may be reduced from say 16 mils at the extruding nozzle to say 3.2 mils after stretching. Typical final thicknesses of the skin layer 14 and 16 may be from about one-tenth of a mil to several tenths of a mil, or even a roll or more, with the core 12 making up the remainder of the thickness. Stretching causes voids 29 to form adjacent to or around the lumpy particles 22a and, to some extent, at the mica platelets 22. The particles ace as "seed" for the discontinuous voids. The voids form In a one-to-one relationship with those of the particles that do act as seeds, so that each void has its own associated particle. Occasionally the size and position of either type of particle as compared to film thickness may be such that void formation incident to stretching also causes rupture of a skin layer so that the fill particle is exposed at one face of the construction, as is shown in connection with a specific lumpy particle 22b in FIG. 1. This may occur at either face. It is to be noted, however, that the voids 29 are isolated from each other. The roughening effect of the filler may occur either indirectly through the bumpiness caused by the filler distorting the extruded film in the thickness direction or directly by breakthrough of filler particles to the surface as in the case of particle 22b.

The thicknesses mentioned above are not intended to be limiting, and it is contemplated that in general overall thickness of the stretched extrudate may vary from half a mil or less to 10 or more mils. To date, constructions of from 1.5 to 6.5 mils have been made.

When the extrudate is to be hot-stretched, and in accordance with accepted hot-stretching techniques, after extrusion and initial chilling the extrudate is reheated to say 275° F. and stretched at the nip between two rolls, the second of which turns at a defined multiple of the turning speed of the first, to thereby define the desired stretch ratio. The stretched extrudate is then further heated to say 300° F. to thereby "heat set" the stretched films.

The use of mica platelets or other high-aspect-ratio fillers in the coextrudate of the present invention is mentioned above. So far as we are aware, it is new to use mica platelets or other high-aspect-ratio filler particles to remove unwanted limpness from an extruded flexible thermoplastic film, even a monoextrusion. Also, it is believed to be novel, even as to a non-extrusion, to provide a multiphase film wherein high-aspect-ratio particles, as distinguished from cicular particles such as calcium carbonate, act as "seeds" for discontinuous void formation.

Rather than as a byproduct of the mining of acicular or high-aspect-ratio filler such as mica, cicular filler may be deliberately included in the extrudate in the presence or absence of an acicular filler. For example, relatively fine cicular particles may be adequate to provide desired roughening for very thin extrudates, so that, for example, relatively fine calcium carbonate particles or silica or other relatively fine cicular particles may be used in thin coextrudates or monoextrusions, with the dimensional relationships of particles and film being chosen so that roughening is accomplished.

It will be understood by those in the industry that at least some materials used as fillers may also be used in small amounts as additives, such as a coloring agent, an antistatic, an antioxidant, a whitening or coloring means, or for other similar purposes. However, such other uses do not generally affect the mechanical behavior or nature of the formed film, and do not represent filling of the film as contemplated by the invention.

Release means is provided on or at the second face or inner side 20 and may comprise a release coating 26 of silicone or other material providing release characteristics (e.g., fluorocarbon) on the skin layer 16, or a release surface presented due to the presence of release components in the skin 16 itself. When a silicone release coat 26 is used, the skin layer 16, being of polypropylene or other material having the good silicone holdout properties of plastics, helps assure good release action and avoidance of blocking by substantially acting as a stop against absorption of the release layer into the core layer and thereby maintaining the uniformity of the release coating 26 after it is applied.

FIG. 2 illustrates a liner stock construction 110 which is similar in many ways to the construction 10 of FIG. 1, and in which similar components are numbered as in FIG. 1 but with the addition of 100 to each reference number. In the construction 110 of FIG. 2, however, there is no separate skin layer on the "back" side or first face 118. Instead, the first face 118 comprises the outer or exposed side of the core layer 112.

In the constructions shown in FIGS. 1 and 2, the first and second faces are roughened by the mechanical effect of the filler material, predominantly the lumpy particles 22a or 122a. Each face should have a roughness of at least about 10 Sheffield units.

As to the minimum roughness of the back face (such as face 18 or face 118) which contacts the steel guide rolls on a manufacturing line, it has been found that the coefficient of friction of the film, as measured against glass, increases with decreasing roughness, so that one would expect the smoothest film, having the highest coefficient of friction, to track the best. Surprisingly however, when roughness of the back face is reduced to less than about the mentioned minimum Sheffield value, tracking of the film deteriorates with decreasing roughness, even though the coefficient of friction is being increased.

As to the minimum roughness of the other face (such as face 20 or 120), it has been found that at least the mentioned minimum Sheffield value is necessary to avoid problems of air entrapment during label application, with higher levels being required in some instances, as will be more fully discussed below.

Both the continuous phase of the core layer 12 (or 112) and the discontinuous phase of filler material 22 (or 122) are dimensionally stable under conditions of moisture absorption or desorption such as may occur during long periods of warehousing in humid or dry climates. The same is true of the skin layer 14 of FIG. 1. The skins 16 and 116 are similarly stable. The dimensional stability of each liner construction is therefore independent of humidity conditions and the construction therefore remains flat (not curled or distorted) under different humidity conditions as encountered at different geographic locations or at the same location at different times. The core layers, as well as the skins of the constructions 10 and 110, are free of all but isolated voids and are substantially free of connected or continuous-phase voids so that the web also remains flat and undistorted under varying web temperature conditions as encountered in hot air drying of inks or coatings for facestocks with which the liner is used.

One accepted test of flatness uses a test sheet of the stock being tested which is 36 inches long and 24 inches wide. The sheet is considered flat if it exhibits a lift of no more than ¼ inch at any corner, edge or interior area portion under the humidity condition or conditions encountered. Such a stock may test "flat" at say 50% relative humidity, a humidity level commonly used at present for quality testing at the factory, but may fail the same test under greater or lesser humidities, particularly where an extreme change in humidity is encountered in the field. In contrast, test sheets of the constructions of the present invention, such as constructions 10 and 110, exhibit less than ⅛ inch lift, and in fact little or no discernible lift, under any humidity condition that can be expected to be encountered, say from 5% to 100% relative humidity.

In the manufacture of the liner of FIG. 1, charges A, B, and C, corresponding respectively to layers 16, 12, and 14, may be prepared for coextrusion through a coextrusion die 30, as schematically illustrated in FIG. 3A. By preselection, charge A contains no filler, charge B contains filler within the ranges specified earlier, and charge C contains no filler or a lower degree of filler. Upon coextrusion through the die 30, the charges form a multilayer extrudate to which the silicone release coating 26 (FIG. 1) may be applied at station R to provide the multilayer web construction 10. Or, the charge for layer 16 may include release components to inherently generate a release surface at the outer face of the layer. If the release coating 26 is applied, it is dried or cured following application by any suitable means (not shown). Prior to application of the release coating at station R, the formed films may be hot-stretched in a known manner to provide machine direction orientation of the liner 10. This is generally done for "roll liner," but generally not for "sheet liner," which terms are defined below.

In accordance with well-known practice in the industry, the release face of a release liner may be coated with a layer of pressure-sensitive adhesive for subsequent transfer of the adhesive to the facestock with which the liner is employed. When the facestock is combined with the liner, the adhesive is joined to the facestock. Later, the liner is removed to expose the adhesive, which now remains permanently joined to the facestock.

Thus, as indicated in FIG. 3A, adhesive may be applied at station S following drying or cure of the release coat previously applied at station R. This may be a tandem coating operation, or the adhesive coating may be on a separate coating line. Or, the adhesive may be applied at some later time prior to the combining of the release liner 10 with facestock. The combining of the liner with a facestock 32 is diagrammatically illustrated in FIG. 3B. FIG. 3C diagrammatically illustrates the die-cutting of the facestock 32, at a station T, into a series of pressure-sensitive labels 34 carried by the release liner 10. As is well known, this step is usually performed by rotary cutting dies and involves the stripping of the matrix (not shown) of waste or trim surrounding the formed labels. FIG. 3D illustrates the application of the labels 34 to passing workpieces 36 by use of a peelback edge 38 to dispense the labels 34 by progressively removing the liner from them in a well-known manner to thereby expose the adhesive side 39 of the labels and project the labels into contact with passing workpieces.

FIG. 4 diagrammatically illustrates a film of conventional or prior art facestock 32 with pressure-sensitive adhesive 40 permanently combined therewith, such facestock being employed in the methods or procedures of the invention at the stage illustrated at the right end of FIG. 3B or the left end of FIG. 3C. At this stage, the adhesive 40 (not shown in FIGS. 3A to 3D) may be releasably carried on the liner 10 of the invention (on or with which it may have been previously coated or combined, as by the previously mentioned coating step at station S). Alternatively, the adhesive 40 may have been directly coated on or combined with the facestock 32 prior to the combining of the facestock with the liner 10. The liner 10 is not shown in FIG. 4; if it were, this figure would illustrate one aspect of the present invention, namely, the combining of a conventional type of facestock with a coextruded liner of the type taught herein.

Where the adhesive contacts the inner face of the liner 10, either at station S or upon the combining of the facestock with the liner 10 if the adhesive is originally coated on or combined with the facestock, the roughness of face 20 of the liner 10 is imparted to the adhesive. When the adhesive is later exposed, as at face 39 in the step illustrated in FIG. 3D, the exposed adhesive face exhibits the roughness imparted by face 20 of the liner. This roughness performs an important function in eliminating or minimizing air entrapment during label application and the resultant forming of blisters or high spots on the applied label.

As indicated above, a roughness of at least about 10 Sheffield units at the adhesive-contacting face is required for avoiding or minimizing air entrapment during label application. However greater roughness generally is better from the standpoint of avoiding air entrapment, and roughnesses of 150 or more may be necessary in some applications, depending on such factors as bottle surface, bottle shape, amount, type and temperature of adhesive, and line speed.

Meanwhile, the reverse or back face 18 of the liner 10, also roughened at least to the specified minimum degree, tracks smoothly and securely and without slippage on the steel idler rolls and drive rolls (not shown) used to guide or drive the liner 10 in any of the stages of FIGS. 3A to 3D.

It will be understood that the operations shown in FIGS. 3A to 3D will often be done at different locations by different manufacturers, or they may be combined. For example, the steps of FIG. 3A may be performed by a liner and adhesives manufacturer, the steps of FIGS. 3B and 3C may be performed by a label manufacturer on one continuous pass, rather than being interrupted by a wind-unwind sequence as illustrated, and the steps of FIG. 3D may be performed by a packager of manufactured products.

Facestock which is formed into labels is usually wound and unwound in roll form and is therefore one form of what is known as "roll stock" or "roll facestock," and the accompanying liner is called "roll liner." Facestock in roll form may also be utilized as continuous tape. The foregoing relates to roll stock and roll liner. In many respects, the invention also applies, however, to "sheet liner" used with "sheet stock" which might be formed as indicated in FIGS. 3A and 3B but would then be cut into sheets and decorated (by screen printing, for example) for use as decals, bumper stickers, thermal die-cut signs, and the like. Materials and procedures used for sheet stock and sheet liner may be the same or may differ to some degree from those used for roll stock and roll liner, but the principles of the construction and manufacture of the liner can be similar whether it be liner for roll stock or sheet stock.

The release liner 110 of FIG. 2 may be roll liner or sheet liner. This liner 110, may be extruded in a manner similar to that indicated in FIG. 3A, but with only two charges corresponding to the layers 116 and 112. The charge corresponding to layer 116 has no filler and the charge corresponding to layer 112 includes the filler 122,122a mixed therein.

The thickness of liner 10 or 110 may be say 3.2 mils with the skin layers 14 and 16 or 116 each being one or several tenths of a rail thick and the core or base 12 or 112 making up the remainder.

Available mined mica supplies with their "impurities" may have the following typical particle size distribution:

TABLE I

| Particle Size Distribution of Mica (Percent By Weight Of Sample On Or Through Screen) | | | |
|---|---|---|---|
| Screen Size | Mica No. 1 | Mica No. 2 | Mica No. 3 |
| +200 | 0.4 | 0.0 | 5.0 |
| +325 | 15.8 | 38.4 | 23.4 |
| −325 | 83.4 | 61.6 | 71.6 |

Note:
+ = retained on screen
− = through screen
Mica No. 1 = acicular
Mica No. 2 = cicular
Mica No. 3 = same as 2 with different grading Since the mesh opening of a 200 mesh screen is 2.9 mils and that of a 325 mesh screen is 1.7 mils, it can be seen that the larger particles in these samples have dimensions exceeding the majority of core or base thickness or even the core thickness itself. (Mica number 3 in the above table is generally unsatisfactory due to 5% content of particles retained on a screen with 2.9 mil mesh openings). Thus it will be understood that considerable surface roughness may be "thrust on" a manufacturer utilizing these fillers to a point where the question is not one of achieving desired minimums but of minimizing roughness. For example, a back face roughness exceeding a relatively low Sheffield value will cause a "dit" (dimple plus pit) problem when the liner is combined with a very smooth soft facestock such as flexible polyvinyl chloride and then wound for storage or transport, since the facestock directly contacts the rough back face in the wound condition. Other only somewhat less dit-prone facestocks include semirigid polyvinyl chloride, polyethylene, and polypropylene, and these may tolerate Sheffield roughnesses off up to about 150. Facestocks of polystyrene, polycarbonate and thermoplastic polyester are more capable of resisting the formation of dits up to Sheffield roughnesses of about 300 or more. Facestocks intended to have rough surfaces that wholly or partially mask any dits that are formed will of course tolerate considerable roughness insofar as the formation of dits is concerned.

In accordance with generally established post-extrusion finishing practice, the coextrudate may pass from the extrusion nozzle though a nip formed by chilled finishing rolls, often a polished steel roll and a silicone rubber roll. The extrudate face on the steel roll side receives a gloss finish and the opposite face receives a matte finish. Generally the face with the matte finish is the guide roll contacting face, such first face 18 or 118, while the opposite face, such second face 20 or 120, is the face with the gloss finish. However, both sides may be given a matte or a gloss finish if desired.

In some circumstances, roughness at a face, particularly the first face, may be provided simply by the matte finishing or embossing effect of a post-extrusion roll of the coextruder. In other words filler may not be necessary to the required roughening effect at a face, and the situation becomes one of avoiding over-roughening due to use of filler.

It will therefore be understood that, looked at from the manufacturing standpoint of minimizing roughening when dit-prone facestock is to be employed or when for other reasons avoidance of over-roughening in a given application is a concern, the invention involves the concept of attenuating the roughening effect of the filler by coextruding at least a second thrilled or relatively unfilled charge along with the filled charge to form the resulting coextrudate, with the second charge forming a skin that tends to smooth the bumps caused by the filler. Generally, the thicker the formed skin, the greater the smoothing action. The smoothing may result from the greater "evening out" effect of the thicker skin, and/or from the accomplishment of full coverage without skin rupture over filler particles which would be otherwise exposed, such as particle 22b in FIG. 1.

Turning now to facestock, prototypical examples of film facestocks illustrating the invention are seen in FIGS. 5 and 6. In FIG. 5, a multilayer web construction, generally indicated by the reference numeral 50, comprises a coextrudate including a core layer 52, a skin layer 54 on the face side of the coextrudate, and a skin layer 56 on the inner side of the coextrudate opposite the face side. Combined on the inner side of the coextrudate is a pressure-sensitive adhesive layer 58. In FIG. 6, a multilayer web construction, generally indicated by the numeral 50a, comprises layers 52a, 54a, 56a, and 58a generally corresponding to the layers 52, 54, 56, and 58 in FIG. 5. However, in FIG. 6, tie layers 53 join the core layer 52a to the skin layers 54a and 56a.

The coextrudates of FIGS. 5 and 6 are similar to the previously described liner stock in that they comprise polymeric film materials, are formed by simultaneous extrusion from a suitable known type of coextrusion die, and are adhered to each other in a permanently combined state to provide a unitary coextrudate. The FIG. 5 construction is used when the materials of the core and skins are such that these layers firmly adhere or bond to each other when coextruded as adjacent film layers. The FIG. 6 construction, with the tie layers 53, is used when the core and skin materials do not sufficiently adhere or bond to each other widen they are extruded together. Generally, the construction of FIG. 5 is presently used for roll film facestock and that of FIG. 6 for sheet film facestocks because, while polyethylene is presently preferred as the core material for both applications, roll film facestocks and sheet film facestocks generally use different skin materials, and the presently preferred material for the skin of the roll film facestock (ethylene vinyl acetate) is compatible with polyethylene in respect of inherent adhesion or bonding, while the presently preferred material for the skin of the sheet film facestock (polyvinyl chloride) is not.

The materials of the layers of constructions 50 and 50a are selected according to the cost/benefit characteristics of candidate materials considering the functional or operational requirements of the layer in question. An important concept of the invention is the application of this principle to the manufacture of facestock by forming the facestock as a coextrudate of materials so selected.

Thus, the facestock at its outside surface may require high weatherability and printability and good uniformity and control of surface texture, whether gloss or matte, whereas these qualities either are not necessary or are required in far lesser degree in the core of the facestocks. The latter, however, must be such as to give the facestock opacity and the desired degree of stiffness, as well as sufficient body and strength, and represents generally the great bulk of the total material used in the construction. The stiffness of this core material should be between about 10 and 100 Gurley. The inner surface of the film coextrudate must give good anchorage for the adhesive.

The presently preferred material for the core layers 54 or 54a in many facestock applications is polyethylene of low, medium, or high density of between about 0.915 and 0.965 specific gravity. This is a relatively low cost, extrudable film-forming material whose stiffness (ranging through decreasing degrees of flexibility to semi-rigid) may be determined by the density selected, and whose body and strength are sufficient for most uses. Polyethylene of lower densities, down to a specific gravity of 0.890, may be employed for greater flexibility.

Another preferred material for the core layers 54 or 54a is polypropylene (or a propylene copolymer) having a flex modulus range of between about 130,000 and 250,000 psi at 73° F., depending on the stiffness desired.

Polyethylene vinyl acetate is generally the presently preferred material for both skin layers 54 and 56 in roll film applications, while polyvinyl chloride is generally the presently preferred material for both skin layers 54a and 56a in sheet film applications. A suitable resin for tie layer 53 in this instance is "CXA", marketed by DuPont. Another material for forming tie layers is "Plexar" marketed by Chemplex Co. Other specific materials are also available for performing the tying function in coextrusion operations. The outer surface of the skin layer 54 or 54a is corona-treated in a known manner to increase printability of the skin.

The preferred identity of the outer and inner skin layer material at present is partly a choice of convenience in reduction to practice, and it is contemplated that these materials often will not be identical in actual manufacture. For example, polyethylene vinyl acetate might be the material of choice for the outer skin, but polyethylene acrylic acid might be used on the inner skin for better anchorage to, say, an acrylic adhesive of choice.

Other materials for the skin layers include meltable film-forming substances used alone or in combination, such as polyethylene methyl polyacrylic acid, polyethylene ethyl acrylate, polyethylene methyl acrylate, acrylonitrile butadiene styrene polymer, nylon, polybutylene, polystyrene, polyurethane, polysulfone, polyvinylidene chloride, polypropylene, polycarbonate, polymethyl pentene, styrene maleic anhydride polymer, styrene acrylonitrile polymer, ionomers based on sodium or zinc salts of ethylene/methacrylic acid, polymethyl methacrylates, cellulosics, fluoroplastics, polyacrylonitriles, and thermoplastic polyesters.

While the foregoing examples of facestocks have employed skin layers on each side of the core, there are instances where a skin layer is employed only on the outer side of the construction, such as the construction 60 shown in FIG. 7, which employs the single skin layer 66 on the outer side of a core layer 62. In this instance, the pressure-sensitive adhesive layer 68 is directly adjacent the core layer. For example, such a construction could be used for the manufacture of high durability labels. Material presently preferred for the core layer in such instance is polyvinyl chloride or acrylonitrile butadiene styrene, and for the skin layer, polyvinylidene fluoride.

It will be understood from the foregoing that multilayer. Film facestocks have been provided having a relatively thick core layer of polymeric film material which contributes the majority of the stock's dimensional stability and stiffness, having a cojoined, relatively thin, ink-printable skin layer at least at the face side of the construction, and having a pressure-sensitive adhesive layer combined at the sides of the construction opposite the face side. From a method standpoint, this is accomplished by coextruding a plurality of at least two charges of film-forming resin to form a coextrudate having a relatively thick core layer and at least one relatively thin skin layer after preselecting the charge for the core layer, as by selection of density or flex modulus, to provide the degree of stiffness suitable for the label or sign application, and after preselecting the charge for the skin layer to provide a skin adapted to the intended decorating process, and combining the coextrudate with a pressure-sensitive adhesive layer.

Thus, in the manufacture of the facestock 50 seen in FIG. 5 charges D, E, and F corresponding respectively to layers 52, 54, and 56, may be prepared for coextrusion through a coextrusion die 70, as schematically illustrated in FIG. 8. Charge E for the core layer is preselected to provide the suitable degree of stiffness, charge D is preselected to allow for good printability (usually following corona treatment of the formed film) and for weatherability if indicated, and charge F is preselected for good adhesive anchorage. As previously indicated, often charges D and F for the skin layers may be the same, and in some applications, the skin layer on the inner or adhesive side, corresponding to charge F, is eliminated. The coextrudate 54, 52, 56 forming the facestock may be hot-stretched.

The coextrudate may be directly coated with the adhesive 58, or the adhesive 58 may be transferred from a liner with which the facestock is combined. In particular, the coextrudate of cojoined facestock layers 54, 52, 56 may be substituted for the facestock 32 of FIGS. 3B to 3D, and the adhesive 58 may be the adhesive applied at the coating station S in FIG. 3A. The result is an all plastic facestock/liner combination in which both the facestock and liner are multilayered.

Instead of being coated or combined on the formed coextrudate as just described, the adhesive 58 may be coextruded along with the film-forming layers 54, 52, 56. The invention also contemplates simultaneously extruding both liner and facestock as by simultaneously extruding all the charges A through F, together with a charge of adhesive 58, which would for example be extruded through an additional orifice adjacent to the orifice for charge F. This would require provision of release means for the liner prior to contact of the liner by the adhesive.

The facestock construction 50a is manufactured in a manner similar to the manufacture of facestock 50. The additional tie layers 53 are coextruded along with the layers 52a, 54a, and 56a.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A method of economically manufacturing die-cut labels using roll or sheet facestock, comprising the steps of providing a plurality of at least two charges of film-forming resin, coextruding said charges to thereby form a construction in the form of a multilayer extrudate comprising a relatively thick core layer and at least one relatively thin skin layer, preselecting the charge for said core layer, as by selection of density or flex modulus, to provide said facestock with a degree of stiffness suitable for the label application, preselecting the charge for said skin layer to provide a skin adapted to the intended decorating process, or surface performance characteristics, of the facestock and combining said extrudate with a pressure-sensitive adhesive layer to form label facestock, combining said facestock with a liner, die-cutting said facestock to form a label releasably adhered to said liner and surrounded by a matrix of excess facestock material, and stripping said matrix of excess facestock material to utilize non-tearing self-supporting properties of said material to pull said matrix away from the die-cut label.

2. The method of claim 1, wherein the method of preselecting the charge for said core layer also includes providing said facestock with sufficient body and strength for the label application.

3. The method of claim 1, wherein the step of preselecting the charge for said core layer includes preselecting a polyolefin polymer or copolymer.

4. The method of claim 3, wherein said core layer comprises a polyethylene layer of a specific gravity of from 0.890 to 0.965.

5. The method of claim 3, wherein said core layer comprises a polypropylene layer with a flex modulus range of from 130,000 to 250,000 psi at 73° F.

6. The method of claim 1, in which said die-cutting of said facestock following said coextruding step is performed in the absence of any intervening step of biaxial stretching of said multilayer coextrudate.

7. The method of claim 1, including the step of hot-stretching said extrudate.

8. The method of claim 1, wherein the step of preselecting the charge for said core layer also includes providing said facestock with an opaque appearance.

9. The method of claim 1, wherein the steps of preselecting the charges for said core and skin layers also include selecting the charges to tightly adhere the layers together to form said construction.

10. The method according to claim 1, wherein said skin layer comprises ethylene-vinyl acetate and said core layer comprises polyethylene, polypropylene or a polypropylene copolymer.

11. A method of economically manufacturing die-cut labels using roll or sheet facestock, comprising the steps of providing a plurality of at least two charges of film-forming resin, coextruding said charges to thereby form a construction in the form of a multilayer extrudate comprising a relatively thick core layer and at least one relatively thin skin layer, preselecting the charge for said core layer, as by selection of density or flex modulus, to provide said facestock with a suitable degree of stiffness and sufficient body and strength for the label application, preselecting the charge for said skin layer to provide a skin adapted to the intended decorating process, or surface performance characteristics, of the facestock, hot-stretching and combining said extrudate with a pressure-sensitive adhesive layer to form label facestock, combining said facestock with a liner, die-cutting said facestock to form a label, releasably adhered to said liner and surrounded by a matrix of excess facestock material, and stripping said matrix of excess facestock material to utilize non-tearing self-supporting properties of said material to pull said matrix away from the die-cut label.

* * * * *